(12) United States Patent
Yang et al.

(10) Patent No.: US 12,279,123 B2
(45) Date of Patent: Apr. 15, 2025

(54) PHYSICAL CELL IDENTIFIER CONFLICT DETECTION, ADJUSTMENT METHOD, AND DEVICE

(71) Applicant: Huawei Technologies Co., Ltd., Shenzhen (CN)

(72) Inventors: Shuigen Yang, Shanghai (CN); Feng Han, Shanghai (CN); Wei Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 17/716,471

(22) Filed: Apr. 8, 2022

(65) Prior Publication Data

US 2022/0232391 A1 Jul. 21, 2022

Related U.S. Application Data

(63) Continuation of application No. PCT/CN2020/116453, filed on Sep. 21, 2020.

(30) Foreign Application Priority Data

Oct. 11, 2019 (CN) .......................... 201910963343.0

(51) Int. Cl.
*H04W 16/04* (2009.01)
*H04W 24/04* (2009.01)
(Continued)

(52) U.S. Cl.
CPC ........... *H04W 16/04* (2013.01); *H04W 24/04* (2013.01); *H04W 48/16* (2013.01); *H04W 56/001* (2013.01)

(58) Field of Classification Search
CPC ..... H04W 16/04; H04W 24/04; H04W 48/16; H04W 56/001
See application file for complete search history.

(56) References Cited

U.S. PATENT DOCUMENTS 8,401,033 B2   3/2013   Palanki et al.
11,184,790 B2  11/2021  Liu et al.
(Continued)

FOREIGN PATENT DOCUMENTS

CN   102256284 A   11/2011
CN   102349333 A    2/2012
(Continued)

OTHER PUBLICATIONS

"Available Tools for PCI Confusion and Collision in NR-U," Agenda item: 11.2.2.2, Source: Nokia, Nokia Shanghai Bell, WID/SID: NR_newRAT-Core—Release 15, Document for: Discussion and Decision, 3GPP TSG-RAN WG2 Meeting #104, R2-1817193, Spokane, USA, Nov. 12-16, 2018, 2 pages.

(Continued)

*Primary Examiner* — Shean Tokuta
(74) *Attorney, Agent, or Firm* — SLATER MATSIL, LLP

(57) ABSTRACT

An information transmission method and related device, the method including receiving, by a terminal device, a first synchronization signal and physical broadcast channel block measurement timing configuration (SMTC) associated with configuring an occasion for the terminal device to measure a synchronization signal and physical broadcast channel block (SSB), obtaining an SSB measurement result by measuring the SSB in the occasion configured through the first SMTC, determining that the SSB measurement result is incorrect for an SSB corresponding to any physical cell identifier (PCI) in response to the terminal device failing to measure at least one of the SSB in increasing order, or measure the SSB at a preset location, and reporting. in response to the SSB measurement result being incorrect, a first SMTC report, where the first SMTC report indicates that the SSB measurement result is incorrect.

17 Claims, 8 Drawing Sheets

(51) Int. Cl.
    *H04W 48/16* (2009.01)
    *H04W 56/00* (2009.01)

(56) References Cited

U.S. PATENT DOCUMENTS

| | | | | |
|---|---|---|---|---|
| 11,659,413 | B2 * | 5/2023 | Akl | H04B 7/0695 |
| | | | | 370/328 |
| 11,895,520 | B2 * | 2/2024 | Gunnarsson | H04W 56/007 |
| 11,909,502 | B2 * | 2/2024 | Shrestha | H04B 7/1851 |
| 2017/0359737 | A1 * | 12/2017 | Singh | H04W 16/14 |
| 2019/0273637 | A1 | 9/2019 | Zhang et al. | |
| 2019/0306734 | A1 | 10/2019 | Huang et al. | |
| 2020/0359251 | A1 * | 11/2020 | Gunnarsson | H04W 24/10 |
| 2022/0232391 | A1 * | 7/2022 | Yang | H04W 16/04 |
| 2023/0199680 | A1 * | 6/2023 | Leng | G01S 19/258 |
| | | | | 370/503 |

FOREIGN PATENT DOCUMENTS

| | | | | |
|---|---|---|---|---|
| CN | 109600770 | A | 4/2019 | |
| CN | 111727632 | A * | 9/2020 | H04J 11/0069 |
| CN | 112654052 | A * | 4/2021 | H04W 16/04 |
| RU | 2756897 | C1 * | 10/2021 | H04W 24/10 |
| WO | 2013071813 | A1 | 5/2013 | |
| WO | 2019160266 | A1 | 8/2019 | |
| WO | WO-2019162861 | A1 * | 8/2019 | H04W 24/10 |
| WO | WO-2021068731 | A1 * | 4/2021 | H04W 16/04 |
| WO | WO-2022028475 | A1 * | 2/2022 | H04L 5/0035 |

OTHER PUBLICATIONS

"SON Enhancements in Rel-17," RP-191370, Source: Ericsson, Agenda: 8, May 27, 2019, 6 pages.

\* cited by examiner

PHYSICAL CELL IDENTIFIER CONFLICT DETECTION, ADJUSTMENT METHOD, AND DEVICE

CROSS-REFERENCE TO RELATED APPLICATIONS

This application is a continuation of International Application No. PCT/CN2020/116453, filed on Sep. 21, 2020, which claims priority to Chinese Patent Application No. 201910963343.0, filed on Oct. 11, 2019. The disclosures of the aforementioned applications are hereby incorporated by reference in their entireties.

TECHNICAL FIELD

Embodiments of this application relate to the field of communications technologies, and in particular, to physical cell identifier (PCI) conflict detection, an adjustment method, and a device.

BACKGROUND

A synchronization signal and physical broadcast channel block (SSB) is introduced into the 5th generation mobile communications system (namely, the 5G communications system). The SSB includes a primary synchronization signal (PSS), a secondary synchronization signal (SSS), and a physical broadcast channel (PBCH), and occupies four symbols in time domain and 240 subcarriers in frequency domain. Each SSB corresponds to one cell.

A concept of SSB measurement timing configuration (SMTC) is introduced into new radio (NR) in the 5G communications system. The SMTC refers to occasions (timing occasions) configured by a network for a terminal device for measuring the SSB. The terminal device only needs to measure the SSB in the occasion configured through the SMTC, to reduce power consumption of the terminal device.

SSBs for a plurality of cells may be transmitted within a frequency range of one carrier, and each cell and an SSB thereof correspond to one physical cell identifier (PCI). A quantity of PCIs in the NR system is limited (the quantity may be 1008). When there are a large quantity of cells in the network, the plurality of cells may reuse a same PCI. If two cells that reuse a same PCI are physically close to each other, the two adjacent cells may use the same PCI, causing a PCI conflict. When the PCI conflict occurs, a network device needs to perform PCI optimization to reallocate a new PCI to the cell in which the PCI conflict occurs. Currently, a PCI conflict is detected by the network device, which performs PCI optimization to resolve a PCI conflict problem. A method in which only the network device detects the PCI conflict tends to have low accuracy of PCI conflict detection.

SUMMARY

Embodiments of this application provide an information transmission method and a related device. According to the method, a PCI conflict may be detected and adjustment for optimization may be performed based on an SMTC. Details about solutions are as follows.

According to a first aspect, an embodiment of this application provides an information transmission method, including first, a terminal device receives a first synchronization signal and physical broadcast channel block measurement timing configuration (SMTC), where the first SMTC is used to configure an occasion for the terminal device for measuring a synchronization signal and physical broadcast channel block (SSB), then, the terminal device measures the SSB in the occasion configured through the first SMTC, to obtain a corresponding SSB measurement result, next, for any physical cell identifier PCI, when the terminal device fails to measure the SSB in increasing order, or the terminal device fails to measure the SSB at a preset location, the terminal device determines that the SSB measurement result is incorrect, and finally, when the SSB measurement result is incorrect, the terminal device reports a first SMTC report, where the first SMTC report is used to indicate that the SSB measurement result is incorrect. In the technical solution of this application in the first aspect, the terminal device measures the SSB in the occasion configured through the SMTC, to obtain the corresponding SSB measurement result. If the SSB measurement result is incorrect, the terminal device reports the first SMTC report to indicate that the SSB measurement result is incorrect. The first SMTC report can trigger or provide assistance to the network device to detect a PCI conflict, to improve accuracy of detection of the PCI conflict.

It should be understood that, the terminal device determines the incorrect SSB measurement result as a PCI conflict. However, the incorrect SSB measurement result determined by the terminal device may be caused by a PCI conflict, or by an error in the SMTC. Therefore, the terminal device reports the first SMTC report to a network device to trigger or provide assistance to the network device (for example, a first network device) to determine whether the incorrect SSB measurement result is caused by a PCI conflict, or by an error in the SMTC. Finally, the network device adjusts the PCI or the SMTC.

In a possible implementation of the first aspect, the first SMTC report may include at least one of the following, including a PCI conflict indication, a cell global identifier, an SSB number, an SSB frequency, or a second SMTC. The PCI conflict indication is used to indicate that the terminal device determines that there is a PCI conflict between at least two cells corresponding to the SSB. The cell global identifier is an identifier used to uniquely identify the cell corresponding to the SSB. The SSB number is a number of the SSB, and is used to identify the SSB in an SSB set (SS-burst). The SSB frequency is a serving frequency for the SSB. The second SMTC is an SMTC determined by the terminal device, and the second SMTC is different from the first SMTC. In a possible implementation of the first aspect, the SSB frequency may be indicated by an absolute radio frequency channel number (ARFCN) of new radio NR. The SSB frequency may alternatively be indicated by an absolute radio frequency channel number (ARFCN) of evolved universal terrestrial radio access (E-UTRAN).

In a possible implementation of the first aspect, the second SMTC includes at least one of the following parameters, including a periodicity, an offset, or duration. Optionally, the second SMTC may be used to update the first SMTC.

In a possible implementation of the first aspect, the network device may be a base station, for example, a net generation eNodeB (gNB or ng-eNB), or may be a centralized unit in a base station, for example, a centralized unit (CU) in a gNB or ng-eNB, or may be a centralized unit control plane in a base station, for example, a centralized unit control plane (CU-CP) in a gNB or ng-eNB.

According to a second aspect, an embodiment of this application provides an information transmission method, including first, a first network device sends a first synchronization signal and physical broadcast channel block measurement timing configuration (SMTC), where the first SMTC is used to configure an occasion for a terminal device for measuring a synchronization signal and physical broadcast channel block (SSB), and then, the first network device receives a first SMTC report, where the first SMTC report is used to indicate that an SSB measurement result is incorrect, and the SSB measurement result is obtained by the terminal device through measurement based on the first SMTC. In the technical solution in the second aspect, the first SMTC report may trigger the first network device to detect a PCI conflict, and the first SMTC report may assist the first network device in detecting a PCI conflict and adjusting a PCI or an SMTC. Therefore, according to the foregoing technical solution, the first network device can detect a PCI conflict with reference to information reported by the terminal device, to improve accuracy of detection of the PCI conflict.

In a possible implementation of the second aspect, the method further includes the first network device adjusts at least one of the following based on the first SMTC report: a first PCI or the first SMTC, where the first PCI is a PCI of a cell corresponding to the SSB. Optionally, the first network device sends the first SMTC to the terminal device. Optionally, the first network device may be a base station, for example, a gNB or ng-eNB, or may be a centralized unit in a base station, for example, a centralized unit (CU) in a gNB or ng-eNB, or may be a centralized unit control plane in a base station, for example, a centralized unit control plane (CU-CP) in a gNB or ng-eNB.

In a possible implementation of the second aspect, the method further includes the first network device sends the first SMTC report to a second network device, where the second network device is configured to adjust at least one of the following based on the first SMTC report: a first PCI or a third SMTC, where the first PCI is a PCI of a cell corresponding to the SSB, and the third SMTC is an occasion configured by the second network device for the terminal device for measuring the SSB. Optionally, the first network device sends the first SMTC to the terminal device. Optionally, the first network device may be a base station, for example, a gNB or ng-eNB, or may be a centralized unit in a base station, for example, a centralized unit (CU) in a gNB or ng-eNB, or may be a centralized unit control plane in a base station, for example, a centralized unit control plane (CU-CP) in a gNB or ng-eNB. Correspondingly, the second network device may be a base station, for example, a gNB or ng-eNB, or may be a centralized unit in a base station, for example, a centralized unit (CU) in a gNB or ng-eNB, or may be a centralized unit control plane in a base station, for example, a centralized unit control plane (CU-CP) in a gNB or ng-eNB.

In a possible implementation of the second aspect, the method further includes the first network device sends a second SMTC report to a third network device, where the second SMTC report is generated by the first network device based on the first SMTC report, the third network device is configured to adjust a first PCI based on the second SMTC report, and the first PCI is a PCI of a cell corresponding to the SSB. Optionally, the third network device is further configured to send the first SMTC to the terminal device. Optionally, the first network device may be a centralized unit (CU) in a gNB or ng-eNB, or may be a centralized unit control plane (CU-CP) in a gNB or ng-eNB. Correspondingly, the third network device may be a distributed unit DU in the gNB or ng-eNB. Optionally, that the first network device sends the first SMTC may be as follows. The first network device sends the first SMTC to the third network device, so that the third network device sends the first SMTC to the terminal device.

In a possible implementation of the second aspect, the second SMTC report may include at least one of the following, including the first SMTC report, a fourth SMTC, or a second PCI. The first SMTC report is sent by the terminal device, the fourth SMTC is an SMTC newly allocated by the first network device, and the second PCI is a PCI newly allocated by the first network device to the cell corresponding to the SSB.

In a possible implementation of the second aspect, the method further includes the first network device sends a second SMTC report to a third network device, where the second SMTC report is generated by the first network device based on the first SMTC report, the third network device is configured to adjust a first PCI based on the second SMTC report, and the first PCI is a PCI of a cell corresponding to the SSB.

In a possible implementation of the second aspect, the second SMTC report includes at least one of the following, including the first SMTC report, a fourth SMTC, or a second PCI. The first SMTC report is sent by the terminal device, the fourth SMTC is an SMTC newly allocated by the first network device, and the second PCI is a PCI newly allocated by the first network device to the cell corresponding to the SSB.

In a possible implementation of the second aspect, the first SMTC report includes at least one of the following, including a PCI conflict indication, a cell global identifier, an SSB number, an SSB frequency, or a second SMTC. The PCI conflict indication is used to indicate that the terminal device determines that there is a PCI conflict between at least two cells corresponding to the SSB. The cell global identifier is used to uniquely identify the cell corresponding to the SSB. The SSB number is a number of the SSB, and is used to identify the SSB in an SSB set. The SSB frequency is a serving frequency for the SSB. The second SMTC is an SMTC determined by the terminal device, and the second SMTC is different from the first SMTC.

In a possible implementation of the second aspect, the SSB frequency may be indicated by an absolute radio frequency channel number (ARFCN) of new radio NR. The SSB frequency may alternatively be indicated by an absolute radio frequency channel number (ARFCN) of evolved universal terrestrial radio access (E-UTRAN).

In a possible implementation of the second aspect, the second SMTC includes at least one of the following parameters. including a periodicity, an offset, or duration. Optionally, the second SMTC may be used to update the first SMTC.

In a possible implementation of the second aspect, the fourth SMTC includes at least one of the following parameters, including a periodicity, an offset, or duration.

According to a third aspect, an embodiment of this application provides a terminal device, including a receiving module, a processing module, and a sending module. The receiving module is configured to receive a first synchronization signal and physical broadcast channel block measurement timing configuration (SMTC), where the first SMTC is used to configure an occasion for the terminal device for measuring a synchronization signal and physical broadcast channel block (SSB). The processing module is configured to measure the SSB in the occasion configured through the first SMTC, to obtain an SSB measurement result, and for an SSB corresponding to any physical cell identifier PCI, if the processing module fails to measure the SSB in increasing order, or the processing module fails to measure the SSB at a preset location, determine that the SSB measurement result is incorrect. The sending module is configured to if it is determined that the SSB measurement result is incorrect, report a first SMTC report, where the first SMTC report is used to indicate that the SSB measurement result is incorrect.

All operations of the terminal device in the information transmission method in the first aspect may be performed by component modules (the receiving module, the processing module, and the sending module) of the terminal device in the third aspect. For details, refer to the related descriptions of the possible implementations of the first aspect. Details are not described herein again.

According to a fourth aspect, an embodiment of this application provides a network device. The network device is a first network device, including a sending module and a receiving module. The sending module is configured to send a first synchronization signal and physical broadcast channel block measurement timing configuration (SMTC), where the first SMTC is used to configure an occasion for a terminal device for measuring a synchronization signal and physical broadcast channel block (SSB). The receiving module is configured to receive a first SMTC report, where the first SMTC report is used to indicate that an SSB measurement result is incorrect, and the SSB measurement result is obtained by the terminal device through measurement based on the first SMTC. Optionally, the network device may further include a processing module.

All operations of the first network device in the information transmission method in the second aspect may be performed by component modules (the receiving module, the processing module, and the sending module) of the first network device in the fourth aspect. For details, refer to the related descriptions of the possible implementations of the second aspect. Details are not described herein again.

According to a fifth aspect, an embodiment of this application provides a computer-readable storage medium. The computer-readable storage medium stores instructions, and when the instructions are run on a computer, the computer is enabled to perform the method according to the first aspect.

According to a sixth aspect, an embodiment of this application provides a computer program product including instructions. When the computer program product runs on a computer, the computer is enabled to perform the method according to the second aspect.

According to a seventh aspect, an embodiment of this application further provides a communications apparatus. The communications apparatus may include an entity such as a terminal device or a chip. The communications apparatus includes a processor and a memory. The memory is configured to store instructions, and the processor is configured to execute the instructions in the memory, so that the communications apparatus performs the method according to the first aspect.

According to an eighth aspect, an embodiment of this application further provides a communications apparatus. The communications apparatus may include an entity such as a network device or a chip. The communications apparatus includes a processor and a memory. The memory is configured to store instructions, and the processor is configured to execute the instructions in the memory, so that the communications apparatus performs the method according to the second aspect. Optionally, the network device may be a first network device.

According to a ninth aspect, an embodiment of this application provides a chip system. The chip system includes a processor, configured to support a terminal device in implementing functions related to the first aspect, for example, sending or processing data and/or information related to the foregoing method. In a possible design, the chip system further includes a memory. The memory is configured to store program instructions and data that are necessary for the terminal device. The chip system may include a chip, or may include a chip and another discrete component.

According to a tenth aspect, an embodiment of this application provides a chip system. The chip system includes a processor, configured to support a network device in implementing functions related to the second aspect, for example, sending or processing data and/or information related to the foregoing method. In a possible design, the chip system further includes a memory. The memory is configured to store program instructions and data that are necessary for the network device. The chip system may include a chip, or may include a chip and another discrete component. Optionally, the network device may be a first network device.

It should be noted that, for related descriptions and beneficial effects of the second aspect to the tenth aspect, refer to related parts in the first aspect. Details are not described herein again.

DETAILED DESCRIPTION OF ILLUSTRATIVE EMBODIMENTS

The following describes in detail the technical solutions in embodiments of this application with reference to the accompanying drawings in embodiments of this application.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "have", and any other variations thereof are intended to cover the non-exclusive inclusion, so that a process, method, system, product, or device that includes a series of units is not limited to those units, but may include other units not expressly listed or inherent to such a process, method, product, or device.

To help better understand the technical solutions of this application, the following first describes configuration parameters of an SMTC used in embodiments of this application. One SSB occupies four symbols in time domain, and occupies 240 subcarriers in frequency domain. At different moments, a cell corresponding to the SSB may send the SSB by using different beams. SSBs sent on a plurality of beams are referred to as an SSB set (SS-Burst). The SSB sent on each beam is uniquely identified by an SSB index (SSB index). In other words, an SSB in one SSB set sent on each beam has a unique SSB index. A maximum quantity of SSB indexes transmitted in one SSB set is determined by a frequency. For a frequency of 3 GHz or below (Sub3G), the maximum quantity of SSB indexes is 4, for a frequency from 3 GHz to 6 GHz, the maximum quantity of SSB indexes is 8, for a frequency above 6 GHz, the maximum quantity of SSB indexes is 64. For a frequency of 6 GHz or below, a terminal device may directly obtain SSB index information from a pilot of a physical broadcast channel (PBCH). For a frequency above 6 GHz, three least significant bits of the SSB index information may be obtained from a PBCH pilot signal, and three most significant bits may be obtained from a master information block (MIB) message. When an actual quantity of beams transmitted in the cell is less than the maximum quantity of SSB indexes, a network device may indicate which SSB indexes have been sent. For example, the network device may notify the terminal device through a system information block 1 (SIB1) message or radio resource control (RRC) signaling.

Figure 1A:
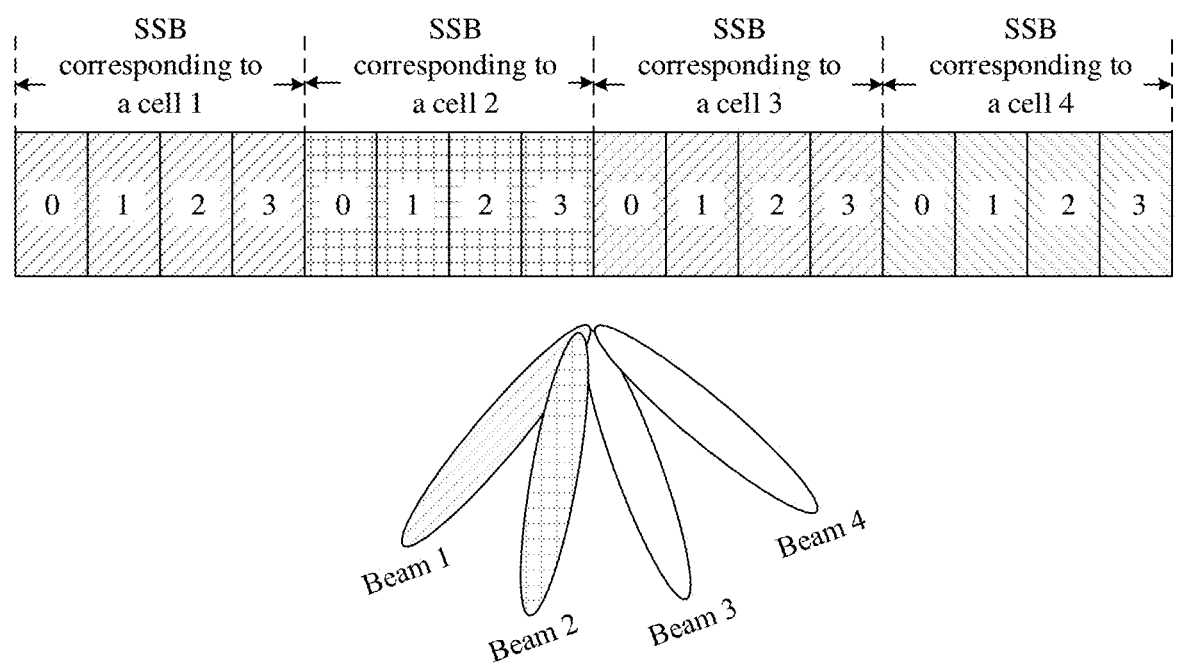
FIG. 1(a) is a schematic diagram of transmission of an SS-burst according to an embodiment of this application.

FIG. 1(a) is a schematic diagram of transmission of an SS-burst according to an embodiment of this application. As shown in FIG. 1(a), a quantity of SSB indexes corresponding to each of cells 1 to 4 is 4, that is, SSB index=0, 1, 2, 3. SSBs corresponding to one SSB index are transmitted on each beam. For example, SSBs with SSB index=0 corresponding to the cells 1 to 4 are transmitted on a beam 1, SSBs with SSB index=1 corresponding to the cells 1 to 4 are transmitted on a beam 2, SSBs with SSB index=2 corresponding to the cells 1 to 4 are transmitted on a beam 3, and SSBs with SSB index=3 corresponding to the cells 1 to 4 are transmitted on a beam 4. Each cell corresponds to one PCI, that is, each cell corresponds to a same PCI by using SSBs sent on different beams. For example, in FIG. 1(a), for a PCI corresponding to the cell 1, the cell 1 corresponds to the PCI by using SSBs with SSB index=0, 1, 2, 3 sent by using different beams. The SSBs with SSB index=0, 1, 2, 3 may be denoted as SSB index #0, SSB index #1, SSB index #2, and SSB index #3, respectively.

To avoid high power consumption caused by unnecessary over-search of the terminal device, a concept of an SSB measurement timing configuration (SMTC) is introduced into NR. The SMTC is an occasion configured by the network device for the terminal device for measuring the SSB. The terminal device only needs to measure the SSB in the occasion configured through the SMTC. Configuration parameters of one SMTC include (1) Periodicity and offset, used to indicate a periodicity of a measurement window at which the terminal device receives the SSB and an offset of the measurement window. The periodicity may be 5 ms, 10 ms, 20 ms, 40 ms, 80 ms, or 160 ms. A value of the offset under each periodicity is taken at a granularity of 1 ms between 0 and a value of the periodicity minus 1 ms. A boundary of the measurement window is aligned with a subframe boundary of a cell for which measurement is configured. (2) Duration, used to indicate a length of the measurement window at which the terminal device receives the SSB. The duration may be 1 ms, 2 ms, 3 ms, 4 ms, or 5 ms. By sending the SMTC, the network device indicates a specific location at which the terminal device measures the SSB, that is, measures the SSB in a specific subframe. For example, the SMTC may indicate locations of SSB index #0, SSB index #1, and SSB index #2 to be measured.

When the terminal device is in a connected state, the SMTC may be sent to the terminal device through RRC signaling. When the terminal device is in an idle state/inactive state, the SMTC may be sent to the terminal device through system information, for example, a SIB 2 or a SIB 4.

The terminal device in embodiments of this application may also be referred to as user equipment (UE), a mobile station (MS), a mobile terminal (MT), or the like, and is a device that provides voice and/or data connectivity for a user or a chip disposed in the device, for example, a handheld device with a wireless connection function, or a vehicle-mounted device. In the following specific embodiments, the terminal device is referred to as a terminal for short.

The network device in embodiments of this application may be any device with a wireless transceiver function, or a chip disposed in a device with a wireless transceiver function. The network device includes but is not limited to a base station (for example, a base station BS, a NodeB NodeB, an evolved NodeB eNodeB or eNB, a gNodeB gNodeB or gNB in a fifth generation 5G communications system, a base station in a future communications system, an access node in a Wi-Fi system, a wireless relay node, or a wireless backhaul node) and the like. In a network structure, the network device may include a centralized unit (CU) node, or a distributed unit (DU) node, or a radio access network device including a CU node and a DU node.

The technical solutions in embodiments of this application are applicable to a communications system, and especially applicable to a next generation (next generation, 5G) mobile communications system. Terms "system" and "network" may be interchanged with each other. A system architecture and a service scenario described in embodiments of this application are intended to describe the technical solutions in embodiments of this application more clearly, but do not constitute a limitation on the technical solutions provided in embodiments of this application. A person of ordinary skill in the art may know that, as the network architecture evolves and a new service scenario emerges, the technical solutions provided in embodiments of this application are also applicable to similar technical problems.

Figure 1B:
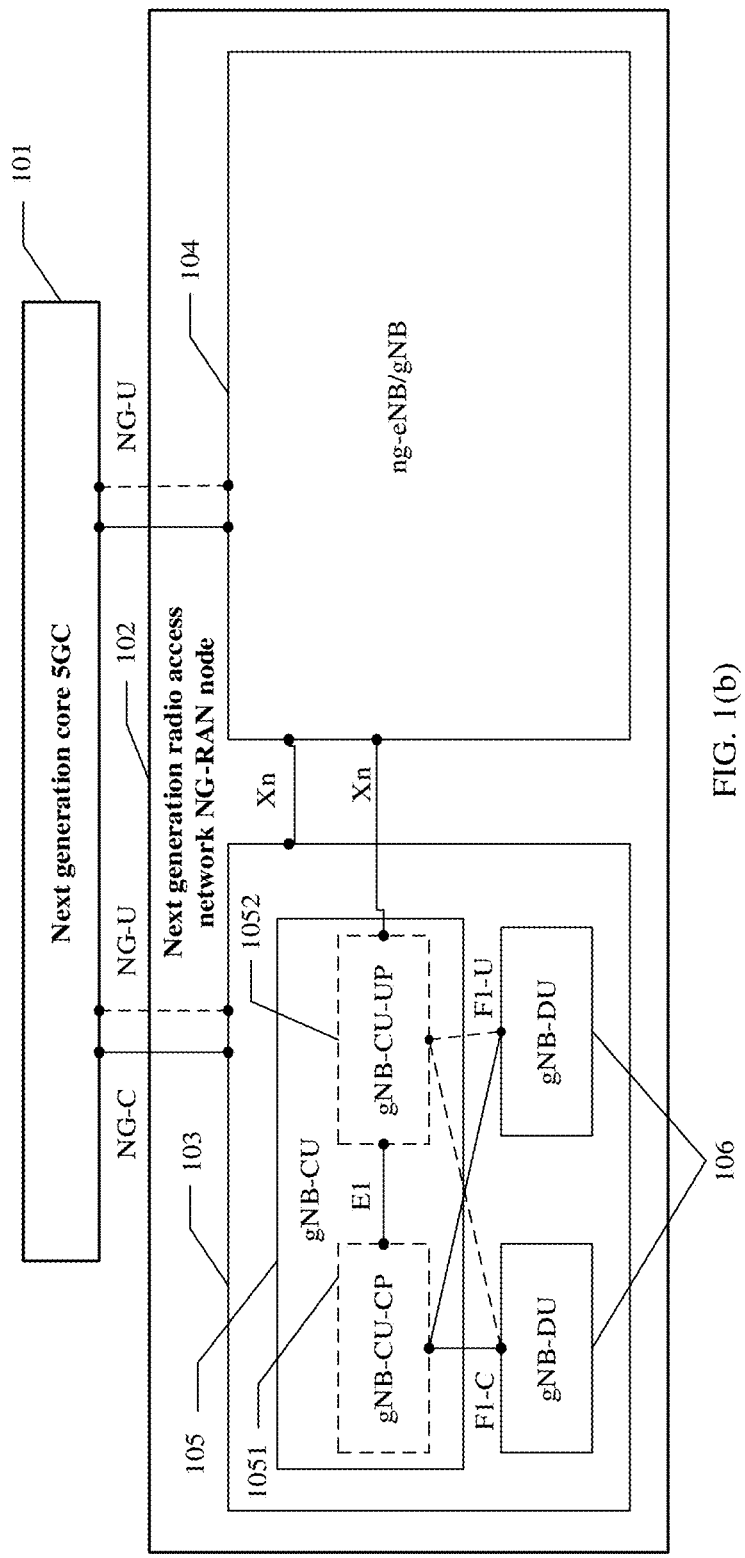
FIG. 1(b) is a schematic diagram of an architecture of a 5G communications system according to an embodiment of this application.

FIG. 1(b) is a schematic diagram of an architecture of a 5G communications system according to an embodiment of this application.

As shown in FIG. 1(b), the 5G communications system includes a next generation core (5GC) 101 and a next generation radio access network (NG-RAN) node 102 connected to the 5GC. The 5GC 101 and the NG-RAN node 102 may be connected through an NG-C (next generation control) interface and an NG-U (next generation user) interface. The NG-C interface is used for control plane transmission. The NG-U interface is used for user plane transmission. In FIG. 1(*b*), a solid line represents control plane transmission and a dashed line represents user plane transmission.

The NG-RAN node may be a gNB and/or a ng-eNB. The gNB provides a user plane function and a control plane function of the NR for the terminal. The ng-eNB provides a user plane function and a control plane function of evolved universal terrestrial radio access (E-UTRA) for the terminal. It should be noted that the gNB and the ng-eNB are merely names, and are used to represent the NG-RAN node supporting the 5G network system and impose no limitation. Connection may be established between gNBs, between the gNB and the ng-eNB, or between ng-eNBs through an Xn interface. FIG. 1(*b*) only shows that the NG-RAN node includes one gNB 103 and one ng-eNB or gNB 104, and the gNB 103 and the ng-eNB/gNB 104 are connected through the Xn interface. The gNB 103 may use a CU-DU split architecture, or may use a CU-DU integrated architecture. In FIG. 1(*b*), that the gNB 103 uses a CU-DU split architecture is used as an example. Similarly, the ng-eNB/gNB 104 may use a CU-DU split architecture, or may use a CU-DU integrated architecture. In FIG. 1(*b*), that the ng-eNB/gNB 104 uses a CU-DU integrated architecture is used as an example.

The CU-DU split architecture means that the gNB or the ng-eNB is divided into one CU and one or more DUs based on functions, where the CU and the DU are connected through an F1 interface. For example, the gNB 103 shown in FIG. 1(*b*) includes one gNB-CU 105 and two gNB-DUs 106. The CU-DU integrated architecture means that function division is not performed for the gNB or the ng-eNB, and the gNB or the ng-eNB performs all functions of the base station.

Further, one CU may include one centralized unit control plane (CU-CP) and one or more centralized unit user planes (CU-UP). The CU-CP and the CU-UP may be connected through an E1 interface, the CU-CP and the DU may be connected through a control plane interface of F1 (F1-C), and the CU-UP and the DU may be connected through a user plane interface of F1 (F1-U). For example, as shown in FIG. 1(*b*), the gNB-CU 105 includes a gNB-CU-CP 1051 and a gNB-CU-UP 1052.

Function division of the CU and the DU may include but is not limited to division according to a protocol stack. A possible division manner according to the protocol stack is as follows. A radio resource control (RRC) layer, a packet data convergence protocol (PDCP) layer, and a service data adaptation protocol (SDAP) layer are deployed on the CU, and a radio link control (RLC) layer, a media access control (MAC) layer, and a physical layer (PHY) are deployed on the DU. Correspondingly, the CU is capable of processing the RRC layer, the PDCP layer, and the SDAP layer. The DU is capable of processing the RLC layer, the MAC layer, and the PHY layer. It should be noted that the foregoing function division is only an example, and there may be alternatively another division manner. For example, the CU is capable of processing the RRC layer, the PDCP layer, the RLC layer, and the SDAP layer, and the DU is capable of processing the MAC layer, and the PHY layer. For another example, the CU is capable of processing the RRC layer, the PDCP layer, the RLC layer, the SDAP layer, and a part of the MAC layer (for example, adding a MAC header), and the DU is capable of processing the PHY layer and a part of the MAC layer (for example, scheduling). Names of the CU and the DU may change, and any access network node that can implement the foregoing functions may be considered as the CU and the DU in this application. The CU-CP has control plane functions of the CU, for example, a processing capability of the RRC layer and a control plane processing capability of the PDCP layer. The CU-UP has user plane functions of the CU, for example, a processing capability of the SDAP layer and a user plane processing capability of the PDCP layer.

The technical solutions in embodiments of this application may be applied to the CU-DU integrated architecture shown in FIG. 1(*b*), or may be applied to the CU-DU split architecture shown in FIG. 1(*b*).

It should still be noted that each SSB corresponds to one cell. Therefore, in embodiments of this application, a PCI of a cell corresponding to a related SSB may be alternatively a PCI corresponding to the SSB. This is not limited in this application.

For ease of understanding the technical solutions in embodiments of this application, the following describes the technical solutions in detail with reference to the specific embodiments of this application. FIG. 2(*a*) is a schematic diagram of an embodiment of an information transmission method according to an embodiment of this application.

201. A first network device sends a first SMTC to a terminal device, where the first SMTC is used to configure an occasion for the terminal device for measuring an SSB.

The first SMTC is a time window configured by the first network device for the terminal device for measuring the SSB. In other words, the first SMTC is used to configure an SSB measurement timing configuration (SMTC) window for the terminal device.

The first SMTC may be optionally used to configure one or more of the following three parameters, including a periodicity, an offset, and duration of the SMTC window.

202. The terminal device measures the SSB in the occasion configured through the first SMTC, to obtain an SSB measurement result.

The terminal device determines the occasion for measuring the SSB based on the first SMTC, and further measures the SSB in the occasion for measuring the SSB, to obtain the corresponding SSB measurement result. The SSB measurement result may include a measurement report obtained after the SSB is measured.

In this embodiment of this application, for related descriptions of a manner of measuring the SSB, refer to other related descriptions. Details are not described in this embodiment of this application.

203. When the SSB measurement result is incorrect, the terminal device reports a first SMTC report to the first network device, where the first SMTC report is used to indicate that the SSB measurement result is incorrect.

In a communications system, when a quantity of cells is relatively large, two or more cells may reuse a same PCI. If there is no sufficient physical spacing distance between the cells that reuse the same PCI, two adjacent cells may use a same PCI, thereby causing a PCI conflict. If a PCI conflict occurs between the adjacent cells, a corresponding call drop rate of the cell in which the PCI conflict occurs increases, a handover success rate of the cell decreases, or a similar problem occurs.

In some embodiments of this application, for any PCI, for example, a first PCI in an NR system, may be any PCI in 1008 PCIs, or any PCI in 504 PCIs in an LTE system. In a same SSB set, SSBs corresponding to one PCI are sent in increasing order of SSB indexes. For example, as shown in FIG. 1(a), SSB indexes corresponding to one PCI are 0, 1, 2, and 3. Then, the SSBs are sent in an order of SSB indexes from 0 to 3. A manner in which the terminal device determines that the SSB measurement result is incorrect includes but is not limited to the following manners.

Manner 1: In some embodiments of this application, for any SSB corresponding to the PCI, if the terminal device fails to measure the SSB in increasing order, the terminal device determines that the SSB measurement result is incorrect. Otherwise, the terminal device determines that the SSB measurement result is correct.

Manner 2: In some embodiments of this application, for any SSB corresponding to the PCI, if the terminal device fails to measure the SSB at a preset location, the terminal device determines that the SSB measurement result is incorrect. Otherwise, the terminal device determines that the SSB measurement result is correct. In the case that the SSB is not measured by the terminal device at the preset location, the terminal device may measure the SSB at a non-preset location.

To facilitate understanding of the foregoing two methods for determining, by the terminal device, whether the SSB measurement result is incorrect, the following provides descriptions by using an example.

For example, the first network device sends three SSB indexes (for example, SSB index #0, SSB index #1, and SSB index #2) of SSBs corresponding to the first PCI, and the first SMTC. Optionally, sending may be performed in a broadcast manner. If no PCI conflict occurs, the result obtained by the terminal device through measurement based on the first SMTC should meet the following three conditions.

(1) A measured initial SSB number is SSB index #0.

(2) A corresponding SSB is measured at a location of each SSB. For example, SSB index #0, SSB index #1, and SSB index #2 are measured at respective locations of SSB index #0, SSB index #1, and SSB index #2. No SSB is measured at a location of SSB index #3.

(3) No SSB corresponding to the first PCI is measured at another location. The another location is a location other than the respective locations of SSB index #0, SSB index #1, and SSB index #2 in the SMTC window configured through the first SMTC. It should be noted that the condition (1) is optional. If the first network device does not send SSB index #0, the SSB measurement result may not meet the condition (1).

The measurement result in Manner 1 is incorrect in the following case, where the terminal device measures, at all the locations corresponding to SSB index #0, SSB index #1, and SSB index #2 in sequence, the SSBs corresponding to the first PCI, but the measured three SSBs are not in increasing order of SSB indices (SSB index #0, SSB index #1, and SSB index #2). For example, the measured three SSBs are in an order of SSB indexes (SSB index #2, SSB index #0, and SSB index #1).

It is easy to understand that if the SSB corresponding to the first PCI is measured at a location other than the location configured through the first SMTC, it indicates that the terminal device measures an SSB in a neighboring cell that reuses the first PCI other than the first cell. In this case, the terminal device may determine that the measurement result of the SSB corresponding to the first PCI is incorrect.

Figure 2A:
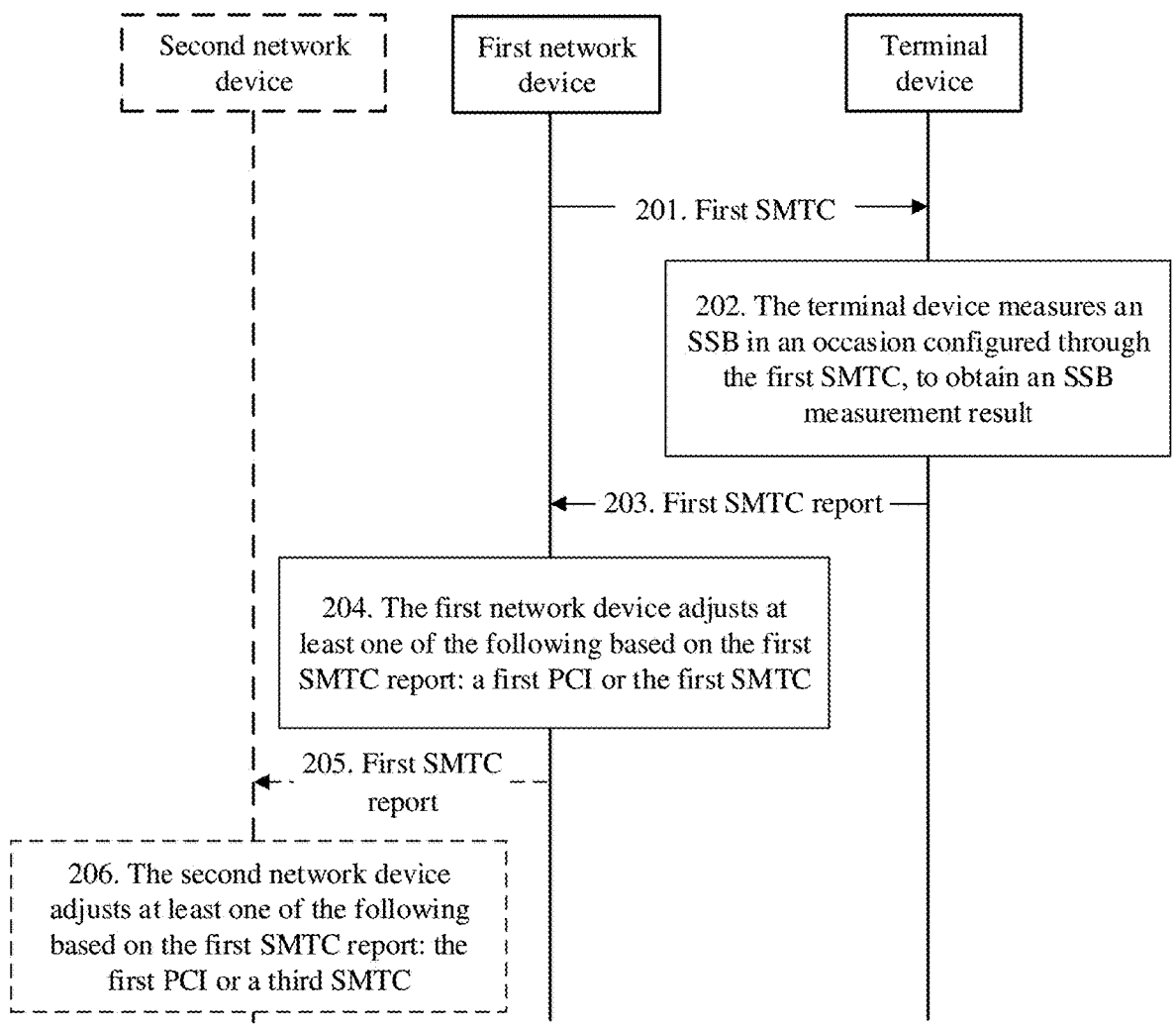
FIG. 2(a) is a schematic diagram of an embodiment of an information transmission method according to an embodiment of this application.
Figure 2B:
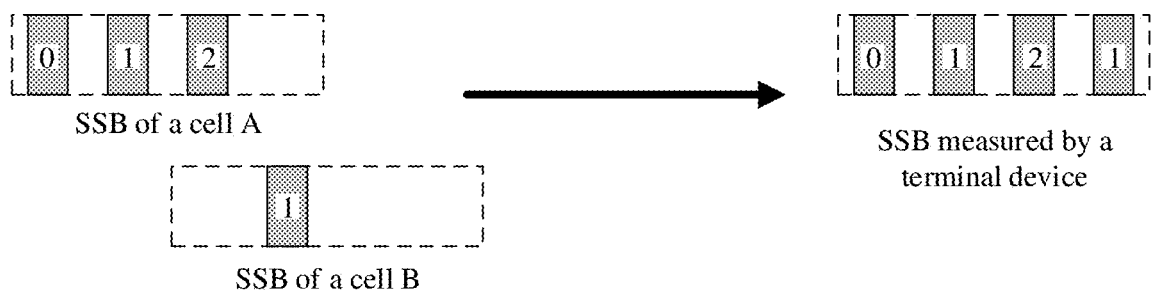
FIG. 2(b) is a schematic diagram of an SSB measurement result according to an embodiment of this application.

A cell A and a cell B are used as an example. The cell A is a camping cell of the terminal device, and the cell B is a neighboring cell of the cell A. As shown in FIG. 2(b), SSB index #0, SSB index #1, and SSB index #2 of the cell A in the figure are SSB indexes sent by the first network device. SSB index #1 of the cell B in the figure is an SSB index sent by the first network device. Based on the configuration of the first SMTC, if the SSB measurement result is correct, for the first PCI, SSB indexes measured by the terminal device are 0, 1, and 2 in sequence. As shown in FIG. 2(b), for the first PCI, the SSB indexes measured by the terminal device are 0, 1, 2, and 1 in sequence. This indicates that a last SSB with an SSB index of 1 measured by the terminal device is not of the cell A but of the cell B, and the SSBs of the cell A are not measured by the terminal device in increasing order. Therefore, the terminal device determines that the SSB measurement result is incorrect.

For the case that the measurement result in Manner 2 is incorrect, when the SSB measurement result meets the foregoing condition (1), the terminal device measures, at locations other than the locations corresponding to SSB index #0, SSB index #1, and SSB index #2, the SSBs (for example, SSB index #0, SSB index #1, and SSB index #2) corresponding to the first PCI. It is also easy to understand that, if the SSB corresponding to the first PCI is measured at another non-preset location (for example, a location other than the locations corresponding to SSB index #0, SSB index #1, and SSB index #2), it indicates that the terminal device measures an SSB in a neighboring cell that reuses the first PCI other than the first cell. In this case, the terminal device may determine that the measurement result of the SSB corresponding to the first PCI is incorrect.

Figure 2C:
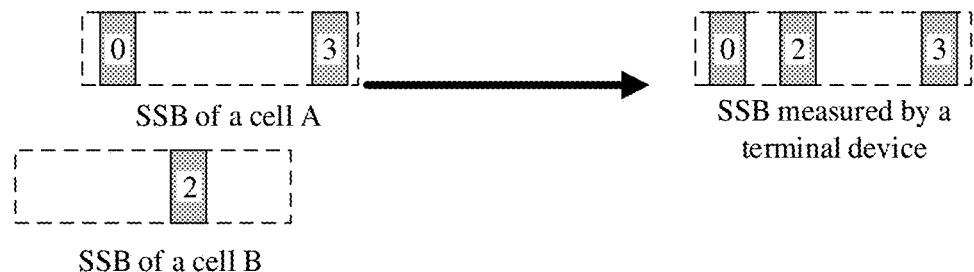
FIG. 2(c) is another schematic diagram of an SSB measurement result according to an embodiment of this application.

The cell A and the cell B are used as an example. The cell A is a camping cell of the terminal device, and the cell B is a neighboring cell of the cell A. As shown in FIG. 2(c), SSB index #0 and SSB index #3 of the cell A in the figure are SSB indexes sent by the first network device. SSB index #2 of the cell B in the figure is an SSB index sent by the first network device. Based on the configuration of the first SMTC, if the SSB measurement result is correct, for the first PCI, SSB indexes measured by the terminal device are 0 and 3 in sequence, and SSBs are spaced by two locations. As shown in FIG. 2(c), for the first PCI, the SSB indexes measured by the terminal device are 0, 2, and 3 in sequence. This indicates that an SSB with an SSB index of 2 measured by the terminal device is not of the cell A but of the cell B, and the terminal device measures the SSB at a non-preset location. Therefore, the terminal device determines that the SSB measurement result is incorrect.

When the terminal device determines that the SSB measurement result is incorrect, the terminal device reports the first SMTC report to the first network device, where the first SMTC report is used to indicate that the SSB measurement result obtained by the terminal device through measurement is incorrect. It should be noted that, the first SMTC report may be a newly defined message, or may be an existing message, for example, a UE information response message. This is not limited in this application.

The terminal device may further report information based on an SMTC information request sent by the first network device. The first network device sends the SMTC information request to the terminal device, where the SMTC information request is used to indicate the terminal device to report a measurement result corresponding to the first SMTC. When the terminal device determines that the SSB measurement result is incorrect, the terminal device reports the first SMTC report to the first network device. When the terminal device determines that the SSB measurement result is correct, the terminal device may directly report the corresponding SSB measurement result to the first network device. It should be noted that the SMTC information request may be a newly defined message, or may be an existing message, for example, a UE information request message. This is not limited in this application.

In some embodiments of this application, the first SMTC report may include but is not limited to at least one of the following, including a PCI conflict indication, a cell global identifier, an SSB number, an SSB frequency, or a second SMTC. The PCI conflict indication is used to indicate that the terminal device determines that there is a PCI conflict between at least two cells corresponding to the SSB. The cell global identifier is an identifier used to uniquely identify the cell corresponding to the SSB. The SSB number is a number of the SSB, and is used to identify the SSB in an SSB set. The SSB frequency is a serving frequency for the SSB. The second SMTC is an SMTC determined by the terminal device, and the second SMTC is different from the first SMTC.

Figure 2D:
FIG. 2(d) is another schematic diagram of an SSB measurement result according to an embodiment of this application.

The second SMTC is an SMTC recommended by the terminal device. The cell A is used as an example. The cell A is a camping cell of the terminal device. As shown in FIG. 2(d), SSB index #0, SSB index #1, and SSB index #2 of the cell A in the figure are SSB indexes sent by the first network device. Based on the configuration of the first SMTC, if the SSB measurement result is correct, for the first PCI, SSB indexes measured by the terminal device are 0, 1, and 2 in sequence. As shown in FIG. 2(d), for the first PCI, the SSB indexes measured by the terminal device are 2, 0, and 1 in sequence, and the SSBs of the cell A are not measured by the terminal device in increasing order. In this case, the terminal device determines that the SSB measurement result is incorrect. This is because configuration parameters of the first SMTC sent by the first network device are incorrect. Consequently, a boundary of a measurement window is not aligned with a subframe boundary of a cell for which measurement is configured. Therefore, the terminal device considers that the SSB measurement result is incorrect, that is, a PCI conflict occurs. In this case, the terminal device may provide a recommended SMTC, so that the boundary of the measurement window is aligned with the subframe boundary of the cell for which measurement is configured. For example, the terminal device provides a recommended offset for the measurement window, so that the SSB indexes obtained by the terminal device through measurement are 0, 1, and 2 in sequence.

It should be noted that the PCI conflict indication described in this application refers to the PCI conflict determined by the terminal device. Based on the SSB measurement result, the terminal device cannot determine whether the incorrect SSB measurement result is caused by the PCI conflict, or by an error in the SMTC. Therefore, regardless of whether the incorrect SSB measurement result is actually caused by a PCI conflict, or by an error in the SMTC, the terminal device determines the incorrect SSB measurement result as a PCI conflict.

The SSB frequency may refer to a location of a resource element 0 (subcarrier #0) in a resource block RB #10 in the SSB.

In some embodiments of this application, the SSB frequency may be indicated by an absolute radio frequency channel number (ARFCN) of the new radio NR. Alternatively, the SSB frequency may be indicated by an ARFCN of evolved universal terrestrial radio access (E-UTRAN).

The foregoing cell global identifier may be an NR cell global identifier (NCGI) or E-UTRAN cell global identifier (ECGI) of the cell corresponding to the SSB. In this case, the cell corresponding to the SSB in which the PCI conflict occurs is referred to as an SSB defined by the cell, that is, a CD-SSB (cell defining SSB). The CD-SSB is an SSB associated with remaining minimum system information (RMSI). Only the CD-SSB can send a master information block (MIB) message and a system information block 1 (SIB1) message, and the terminal device accesses a cell only based on a synchronization signal of the CD-SSB when performing cell selection. Another SSB that is not associated with the RMSI can send only the MIB message but not the SIB1 message.

The foregoing SSB number may be an SSB index, and the SSB index is used to identify an SSB in one SS burst.

The foregoing PCI conflict indication may refer to a PCI of at least two cells, for which the terminal device determines that a PCI conflict occurs, corresponding to the SSB. In other words, the terminal device determines that the at least two cells corresponding to the SSB are configured with a same PCI. In some embodiments of this application, the PCI conflict indication may be the first PCI. In some embodiments of this application, the PCI conflict indication may be a conflict indication, for example, a PCI collision or a PCI confusion. In some embodiments of this application, the PCI conflict indication may be the first PCI and a conflict indication.

In this embodiment of this application, it should be noted that the incorrect SSB measurement result determined by the terminal device may be caused by an error in the first SMTC configured by the first network device, or may be caused by a PCI conflict between cells corresponding to the SSB. For the terminal device, the terminal device cannot determine a specific cause of the incorrect SSB measurement result. The first network device further determines whether the incorrect SSB measurement result is actually caused by the SMTC error or by the PCI conflict.

204. The first network device adjusts at least one of the following based on the first SMTC report, including the first PCI or the first SMTC, where the first PCI is a PCI of a cell corresponding to the SSB.

For the first network device, the first SMTC report is auxiliary information used to determine whether a PCI conflict occurs or the SMTC is incorrect. The adjustment of the cell by the first network device may include the following several cases.

Case 1: The first network device determines that a PCI conflict occurs between cells corresponding to the SSB. The first network device may adjust only a first PCI of a corresponding cell. For example, the first network device reallocates a new fourth PCI to a cell in which the PCI conflict occurs. The fourth PCI is different from the first PCI.

Case 2: The first network device determines that a first SMTC corresponding to the SSB has an error. The first network device may adjust only the first SMTC corresponding to the SSB. For example, the first network device updates the first SMTC by using the second SMTC in the first SMTC report, or the first network device reallocates a new fourth SMTC, where the fourth SMTC is an occasion newly configured by the first network device for the terminal device for measuring the SSB.

Case 3: The first network device determines that a PCI conflict occurs between cells corresponding to the SSB, and a first SMTC corresponding to the SSB has an error. The first network device adjusts both the first PCI of the cell corresponding to the SSB and the first SMTC corresponding to the SSB.

In a possible implementation, in a scenario in which the first network device adjusts the PCI or the SMTC, the first network device may be any one of the following, including the gNB 103, the gNB-CU 105, the gNB-CU-CP 1051/1052, or the ng-eNB/gNB 104.

In this embodiment of this application, in a possible implementation, the method in which the first network device determines, based on the first SMTC report, whether a PCI conflict occurs or the SMTC has an error may be as follows. If the first network device determines, based on the first SMTC report, that an initial SSB index in the SMTC detected by the terminal device is not 0, the first network device determines that the first SMTC corresponding to the SSB has an error, otherwise, the first network device determines that a PCI conflict occurs between cells corresponding to the SSB.

In this embodiment of this application, in another possible implementation, the method in which the first network device determines, based on the first SMTC report, whether a PCI conflict occurs or the SMTC has an error may be as follows. Based on the preconfigured first PCI of the cell corresponding to the SSB, the first network device first determines whether there is a conflict for a PCI of the cells corresponding to the SSB, if there is no conflict for the PCI of the cells corresponding to the SSB, the first network device determines that the first SMTC corresponding to the SSB has an error.

It should be noted that, when there is a conflict for the PCI of the cells corresponding to the SSB, if the cells in which the PCI conflict occurs belong to one network device (for example, the first network device), the first network device adjusts the PCI, if the cells in which the PCI conflict occurs belong to different network devices (for example, respectively belong to the first network device and a second network device), both the first network device and the second network device can adjust the PCI. Similarly, when a first SMTC of the cells corresponding to the SSB has an error, if the cells corresponding to the SSB belong to one network device (for example, the first network device), the first network device adjusts the first SMTC configured by the first network device, if the cells corresponding to the SSB belong to different network devices (for example, respectively belong to the first network device and the second network device), the first network device may adjust the first SMTC configured by the first network device, and the second network device may adjust a third SMTC configured by the second network device.

Optionally, in operation 205, the first network device sends the first SMTC report to the second network device.

Optionally, in operation 206, the second network device adjusts at least one of the following based on the first SMTC report: the first PCI or the third SMTC.

The third SMTC is an occasion configured by the second network device for the terminal device for measuring the SSB. That the second network device adjusts the third SMTC may be as follows. The second network device allocates a new fifth SMTC to the cell in which a PCI conflict occurs, where the fifth SMTC is different from the third SMTC. That the second network device adjusts the first PCI may be as follows. The second network device reallocates a fifth PCI for the cell in which the PCI conflict occurs, where the fifth PCI is different from the first PCI.

In a possible implementation, in a scenario in which the first network device does not adjust the PCI or the SMTC, the first network device may be any one of the following, including the gNB 103, the gNB-CU 105, the gNB-CU-CP 1051/1052, or the ng-eNB/gNB 104, and the second network device may be any one of the following except the first network device: the gNB 103, the gNB-CU 105, the gNB-CU-CP 1051/1052, or the ng-eNB/gNB 104.

It should be further noted that, the first network device may further send a second SMTC report to the second network device, where the second SMTC report is generated based on the first SMTC report. The second SMTC report includes at least one of the following, including the first SMTC report, the fourth SMTC, or a second PCI. The first SMTC report is sent by the terminal device, the fourth SMTC is an SMTC newly allocated by the first network device, and the second PCI is a PCI newly allocated by the first network device to the cell corresponding to the SSB.

In this embodiment of this application, the terminal device measures the SSB in the occasion configured through the SMTC, to obtain a corresponding SSB measurement result. If the SSB measurement result is incorrect, the terminal device reports the first SMTC report to indicate that the SSB measurement result is incorrect. It should be understood that, the terminal device determines the incorrect SSB measurement result as a PCI conflict. However, a factor that actually causes the incorrect SSB measurement result may be the PCI conflict or SMTCan error in the SMTC. Therefore, on the terminal device side, the foregoing technical solution can implement SMTC-based PCI conflict detection. Further, the terminal device reports the first SMTC report to notify the network device that the terminal device has detected an incorrect SSB measurement result, thereby assisting the first network device in determining whether the incorrect SSB measurement result is caused by the PCI conflict, or by SMTC the error in the SMTC. Finally, the first network device adjusts the PCI or the SMTC.

Figure 3:
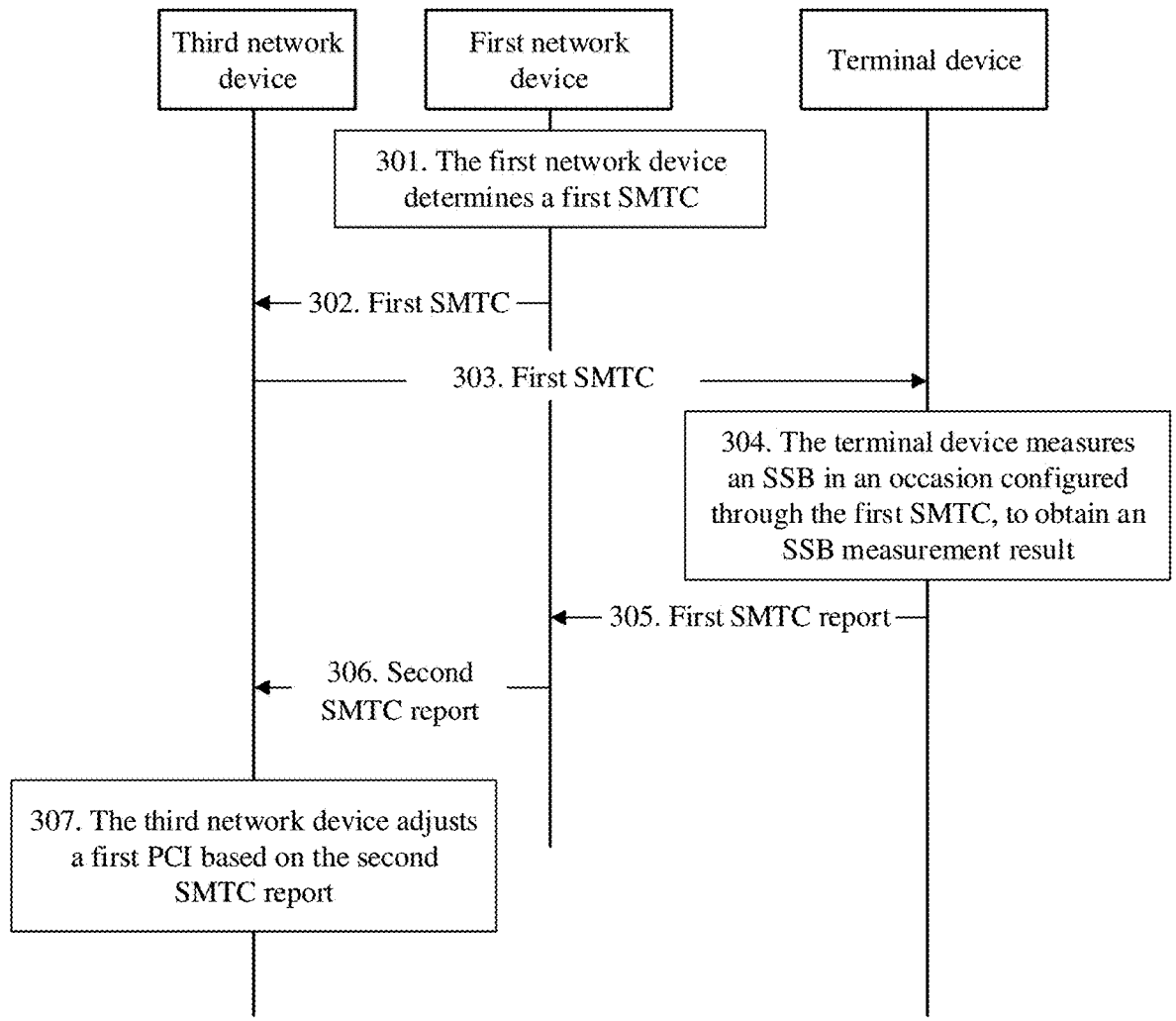
FIG. 3 is a schematic diagram of another embodiment of an information transmission method according to an embodiment of this application.

FIG. 3 is a schematic diagram of another embodiment of an information transmission method according to an embodiment of this application.

301. A first network device determines a first SMTC, where the first SMTC is used to configure an occasion for the terminal device for measuring an SSB.

302. The first network device sends the first SMTC to a third network device.

303. The third network device sends the first SMTC to the terminal device.

When the terminal device is in an idle state or inactive state, after the third network device receives the first SMTC sent by the first network device, the third network device sends the first SMTC to the terminal device through system information.

When the terminal device is in a connected state, the first network device sends the first SMTC to the third network device through RRC signaling, and the third network device forwards the RRC signaling to the terminal device.

304. The terminal device measures the SSB in the occasion configured through the first SMTC, to obtain an SSB measurement result.

305. If the terminal device determines that the SSB measurement result is incorrect, the terminal device reports a first SMTC report to the first network device, where the first SMTC report is used to indicate that the SSB measurement result is incorrect.

Operations 301, 304, and 305 are similar to operations 201, 202, and 203 respectively. For details, refer to the related descriptions of the embodiment corresponding to FIG. 2(a). Details are not described herein again.

306. The first network device sends a second SMTC report to the third network device, where the second SMTC report is generated based on the first SMTC report.

The second SMTC report includes at least one of the following, including the first SMTC report, a fourth SMTC, or a second PCI. The first SMTC report is sent by the terminal device, the fourth SMTC is an occasion newly configured by the first network device for the terminal device for measuring the SSB, and the second PCI is a PCI newly allocated by the first network device to a cell corresponding to the SSB.

When the first network device determines that a PCI conflict determined by the terminal device is a real PCI conflict, the second PCI may be included or not included in the second SMTC report.

When the first network device determines that the PCI conflict determined by the terminal device is actually caused by SMTCan error in the SMTC, the second SMTC report includes the fourth SMTC.

307. The third network device adjusts the first PCI based on the second SMTC report, where the first PCI is a PCI of the cell corresponding to the SSB.

If the first network device determines that the PCI conflict determined by the terminal device is a real PCI conflict, when the second SMTC report includes the second PCI, the third network device adjusts the first PCI, so that the adjusted first PCI is the same as the second PCI, when the second SMTC report does not include the second PCI, the third network device determines, based on the second SMTC report, that the PCI conflict occurs, and in this case, the third network device adjusts the first PCI. For example, the third network device allocates a new PCI to the cell corresponding to the SSB.

If the first network device determines that the PCI conflict determined by the terminal device is actually caused by SMTCan error in the SMTC, the first network device allocates a new fourth SMTC, and sends the fourth SMTC to the third network device, so that the third network device sends the fourth SMTC to the terminal device.

In a possible implementation, the first network device may be a CU or a CU-CP. The first network device may be any one of the gNB-CU 105, the gNB-CU-CP 1051, or the gNB-CU-CP 1052 described in FIG. 1(*b*). Correspondingly, the third network device may be a DU. The third network device may be the gNB-DU 106 described in FIG. 1(*b*).

It should be noted that, for brief description, the foregoing method embodiments are represented as a series of actions. However, a person skilled in the art should appreciate that this application is not limited to the described order of the actions, because according to this application, some operations may be performed in other orders or simultaneously. It should be further appreciated by a person skilled in the art that embodiments described in this specification, and the related actions and modules are not necessarily required by this application.

To better implement the foregoing solutions in embodiments of this application, the following further provides a related apparatus for implementing the foregoing solutions.

Figure 4:
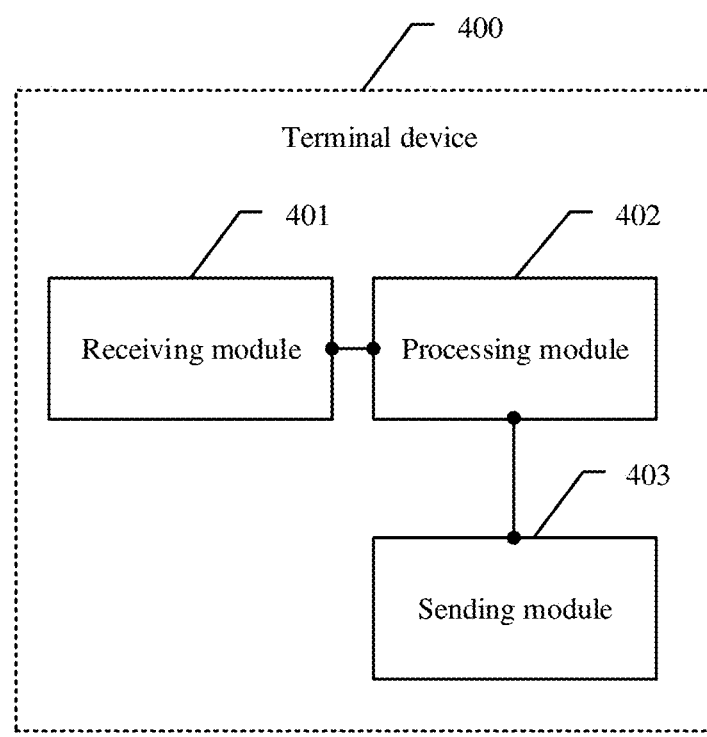
FIG. 4 is a schematic diagram of a composition structure of a terminal device according to an embodiment of this application.

FIG. 4 is a schematic diagram of a composition structure of a terminal device according to an embodiment of this application.

As shown in FIG. 4, a terminal device 400 includes a receiving module 401, a processing module 402, and a sending module 403. The receiving module 401 is configured to receive a first synchronization signal and physical broadcast channel block measurement timing configuration (SMTC), where the first SMTC is used to configure an occasion for the terminal device for measuring a synchronization signal and physical broadcast channel block (SSB). The processing module 402 is configured to measure the SSB in the occasion configured through the first SMTC, to obtain an SSB measurement result, and for an SSB corresponding to any physical cell identifier PCI, if the processing module 402 fails to measure the SSB in increasing order, or the processing module 402 fails to measure the SSB at a preset location, determine that the SSB measurement result is incorrect. The sending module 403 is configured to if a PCI conflict occurs between cells corresponding to the to-be-measured SSB, report a first SMTC report, where the first SMTC report is used to indicate that the PCI conflict occurs between the cells corresponding to the to-be-measured SSB.

In some implementations of this embodiment of this application, the first SMTC report includes at least one of the following, including a PCI conflict indication, a cell global identifier, an SSB number, an SSB frequency, or a second SMTC. The PCI conflict indication is used to indicate that the terminal device determines that there is a PCI conflict between at least two cells corresponding to the SSB. The cell global identifier is an identifier used to uniquely identify the cell corresponding to the SSB. The SSB number is a number of the SSB, and is used to identify the SSB in an SSB set. The SSB frequency is a serving frequency for the SSB. The second SMTC is an SMTC determined by the terminal device, and the second SMTC is different from the first SMTC.

In some implementations of this embodiment of this application, the SSB frequency is indicated by an absolute radio frequency channel number (ARFCN) of new radio NR.

In some implementations of this embodiment of this application, the SSB frequency is indicated by an absolute radio frequency channel number (ARFCN) of evolved universal terrestrial radio access (E-UTRAN).

In some implementations of this embodiment of this application, the second SMTC includes at least one of the following parameters, including a periodicity, an offset, or duration. Optionally, the second SMTC may be used to update the first SMTC.

Figure 5:
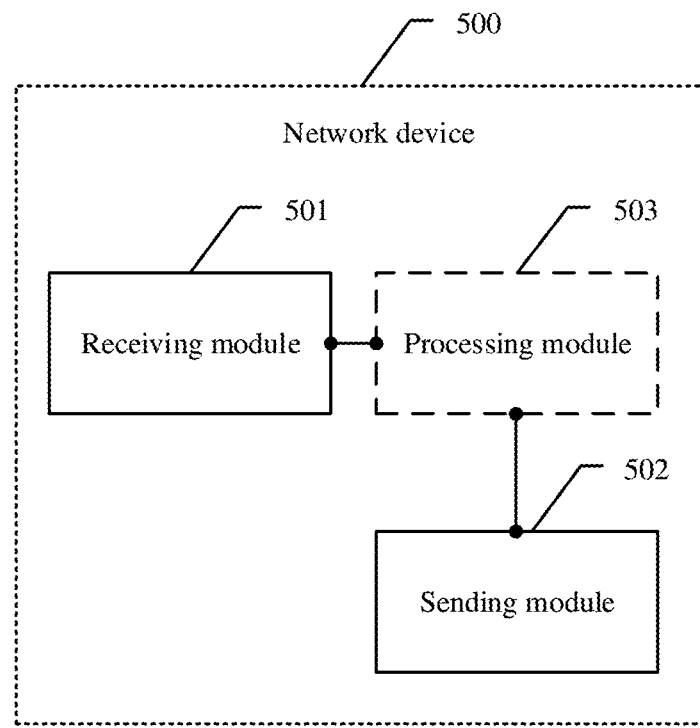
FIG. 5 is a schematic diagram of a composition structure of a network device according to an embodiment of this application.

FIG. 5 is a schematic diagram of a composition structure of a network device according to an embodiment of this application.

As shown in FIG. 5, a network device 500 includes a sending module 502 and a receiving module 501. The sending module 502 is configured to send a first synchronization signal and physical broadcast channel block measurement timing configuration (SMTC), where the first SMTC is used to configure an occasion for a terminal device for measuring a synchronization signal and physical broadcast channel block (SSB). The receiving module 501 is configured to receive a first SMTC report, where the first SMTC report is used to indicate that an SSB measurement result is incorrect, and the SSB measurement result is obtained by the terminal device through measurement based on the first SMTC. Optionally, the network device 500 may further include a processing module 503.

In some implementations of this embodiment of this application, the processing module 503 is configured to adjust at least one of the following based on the first SMTC report: a first PCI or the first SMTC, where the first PCI is a PCI of a cell corresponding to the SSB. Optionally, the sending module 502 is further configured to send the first SMTC to the terminal device.

In some implementations of this embodiment of this application, the sending module 502 is configured to send the first SMTC report to a second network device, where the second network device is configured to adjust at least one of the following based on the first SMTC report: a first PCI or a third SMTC, where the first PCI is a PCI of a cell corresponding to the SSB, and the third SMTC is an occasion configured by the second network device for the terminal device for measuring the SSB. Optionally, the sending module 502 is further configured to send the first SMTC to the terminal device.

In some implementations of this embodiment of this application, the sending module 502 is configured to: send a second SMTC report to a third network device, where the second SMTC report is generated by the first network device based on the first SMTC report. The third network device is configured to adjust a first PCI based on the second SMTC report, and the first PCI is a PCI of a cell corresponding to the SSB. Optionally, the third network device is further configured to send the first SMTC to the terminal device. Optionally, the sending module is further configured to send the first SMTC to the third network device, so that the third network device sends the first SMTC to the terminal device.

In some implementations of this embodiment of this application, the first SMTC report includes at least one of the following, including a PCI conflict indication, a cell global identifier, an SSB number, an SSB frequency, or a second SMTC. The PCI conflict indication is used to indicate that the terminal device determines that there is a PCI conflict between at least two cells corresponding to the SSB. The cell global identifier is an identifier used to uniquely identify the cell corresponding to the SSB. The SSB number is a number of the SSB, and is used to identify the SSB in an SSB set. The SSB frequency is a serving frequency for the SSB. The second SMTC is an SMTC determined by the terminal device, and the second SMTC is different from the first SMTC.

In some implementations of this embodiment of this application, the SSB frequency is indicated by an absolute radio frequency channel number (ARFCN) of new radio NR.

In some implementations of this embodiment of this application, the SSB frequency is indicated by an absolute radio frequency channel number (ARFCN) of evolved universal terrestrial radio access (E-UTRAN).

In some implementations of this embodiment of this application, the second SMTC includes at least one of the following parameters, including a periodicity, an offset, or duration. Optionally, the second SMTC may be used to update the first SMTC.

In addition, the terminal device and the network device in this embodiment of this application may be further described in another module division manner. For example, the terminal device and the network device may include corresponding units or modules for implementing functions, operations, or operations in the foregoing method, and the units or modules may be implemented by software, hardware, or a combination of hardware and software, to support the terminal device and the network device in executing or implementing the technical solutions in this embodiment. Details are not described in this embodiment of this application. It should be noted that content such as information exchange between the modules/units of the apparatus and the execution processes thereof is based on a same concept as the method embodiments of this application, and achieves same technical effects as the method embodiments of this application. For specific content, refer to the foregoing description in the method embodiments of this application. Details are not described herein again.

Figure 6:
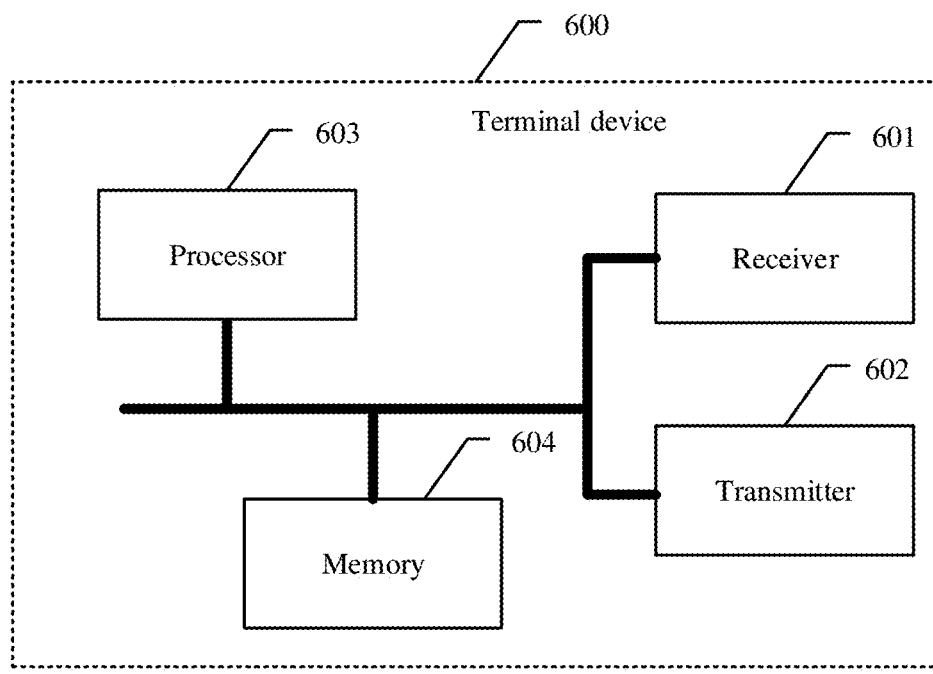
FIG. 6 is a schematic diagram of another composition structure of a terminal device according to an embodiment of this application.

The following describes another terminal device provided in embodiments of this application. Referring to FIG. 6, a terminal device 600 includes a receiver 601, a transmitter 602, a processor 603, and a memory 604 (there may be one or more processors 603 in the terminal device 600, and one processor is used as an example in FIG. 6). In some embodiments of this application, the receiver 601, the transmitter 602, the processor 603, and the memory 604 may be connected through a bus or in another manner. In FIG. 6, connection through a bus is used as an example.

The memory 604 may include a read-only memory and a random access memory, and provide instructions and data to the processor 603. A part of the memory 604 may further include a non-volatile random access memory (NVRAM). The memory 604 stores an operating system and operation instructions, an executable module or a data structure, a subset thereof, or an extended set thereof. The operation instructions may include various operation instructions to implement various operations. The operating system may include various system programs, to implement various basic services and process hardware-based tasks.

The processor 603 controls operations of the terminal device, and the processor 6o3 may also be referred to as a central processing unit (CPU). In a specific application, components of the terminal device are coupled together by using a bus system. In addition to a data bus, the bus system may further include a power bus, a control bus, and a status signal bus. However, for clear description, various types of buses in the figure are referred to as the bus system.

The method disclosed in the foregoing embodiment of this application may be applied to the processor 603, or may be implemented by the processor 603. The processor 603 may be an integrated circuit chip and has a signal processing capability. In an implementation process, the operations in the foregoing methods can be completed by using a hardware integrated logic circuit in the processor 603, or by using instructions in a form of software. The processor 603 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the operations, and logical block diagrams that are disclosed in embodiments of this application. The general-purpose processor may be a microprocessor, or the processor may be any conventional processor, or the like. The operations of the methods disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 604, and the processor 603 reads information in the memory 604, and completes the operations in the foregoing methods in combination with hardware of the processor 603.

The receiver 601 may be configured to receive input digit or character information, and generate signal input related to a related setting and function control of the terminal device. The transmitter 602 may include a display device such as a display screen. The transmitter 602 may be configured to output the digit or character information through an external interface.

In this embodiment of this application, the processor 603 is configured to perform the foregoing information transmission method performed by the terminal device.

Figure 7:
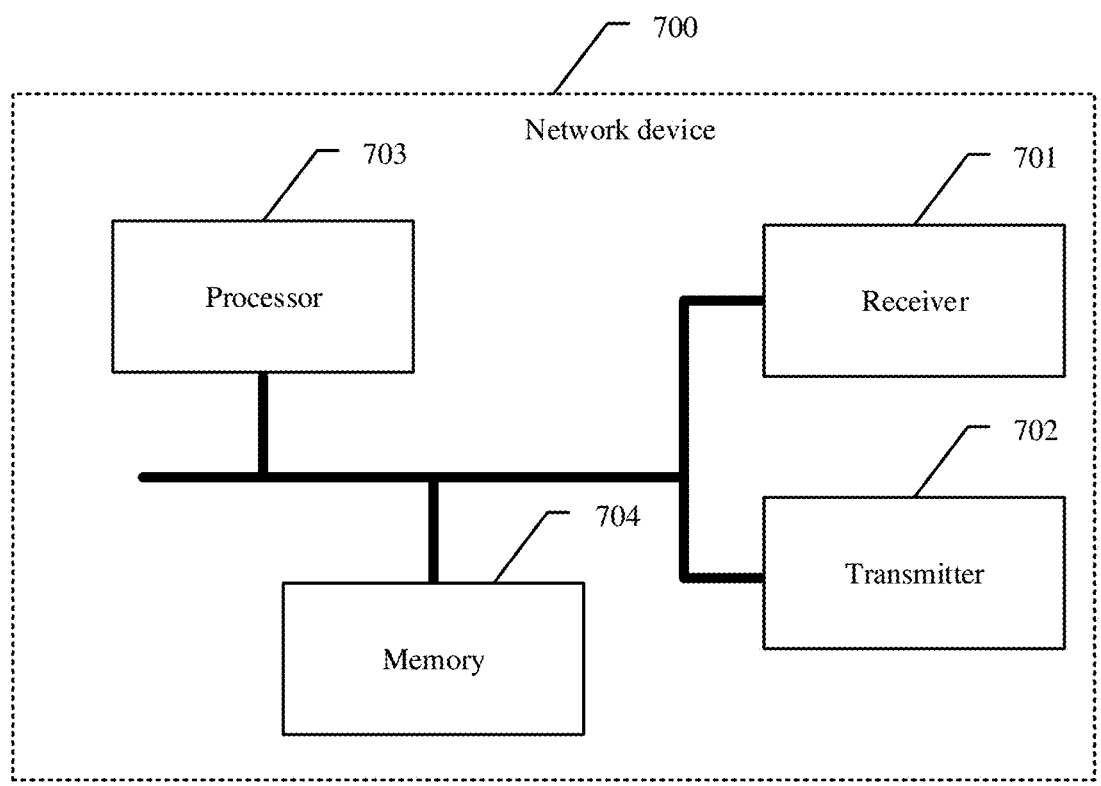
FIG. 7 is a schematic diagram of another composition structure of a network device according to an embodiment of this application.

The following describes another network device provided in embodiments of this application. Referring to FIG. 7, the network device 700 includes a receiver 701, a transmitter 702, a processor 703, and a memory 704 (there may be one or more processors 703 in the network device 700, and one processor is used as an example in FIG. 7), where in some embodiments of this application, the receiver 701, the transmitter 702, the processor 703, and the memory 704 may be connected through a bus or in another manner, and in FIG. 7, a bus connection is used as an example.

The memory 704 may include a read-only memory and a random access memory, and provide instructions and data to the processor 703. A part of the memory 704 may further include an NVRAM. The memory 704 stores an operating system and operation instructions, an executable module or a data structure, a subset thereof, or an extended set thereof. The operation instructions may include various operation instructions to implement various operations. The operating system may include various system programs, to implement various basic services and process hardware-based tasks.

The processor 703 controls operations of the network device, and the processor 703 may also be referred to as a CPU. In specific application, components of the network device are coupled together by using a bus system. In addition to a data bus, the bus system may further include a power bus, a control bus, and a status signal bus. However, for clear description, various types of buses in the figure are referred to as the bus system.

The method disclosed in the foregoing embodiment of this application may be applied to the processor 703, or may be implemented by the processor 703. The processor 703 may be an integrated circuit chip and has a signal processing capability. In an implementation process, operations in the foregoing methods can be completed by using a hardware integrated logic circuit in the processor 703, or by using instructions in a form of software. The foregoing processor 703 may be a general-purpose processor, a DSP, an ASIC, an FPGA or another programmable logic device, a discrete gate or transistor logic device, or a discrete hardware component. The processor may implement or perform the methods, the operations, and logical block diagrams that are disclosed in embodiments of this application. The general-purpose processor may be a microprocessor, or the processor may be any conventional processor, or the like. The operations of the methods disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 704, and the processor 703 reads information in the memory 704 and completes the operations in the foregoing methods in combination with hardware of the processor.

In this embodiment of this application, the processor 703 is configured to perform the foregoing information transmission method performed by the network device.

In another possible design, a chip includes a processing unit and a communications unit. The processing unit may be, for example, a processor, and the communications unit may be, for example, an input/output interface, a pin, or a circuit. The processing unit may execute computer-executable instructions stored in a storage unit, so that a chip in the terminal device is enabled to perform the information transmission method in any one of the foregoing embodiments.

Optionally, the storage unit is a storage unit in the chip, for example, a register or a cache, or the storage unit may be a storage unit in the terminal device but outside the chip, for example, a read-only memory (ROM) or another type of static storage device capable of storing static information and instructions, or a random access memory (RAM).

The processor mentioned anywhere above may be a general-purpose central processing unit, a microprocessor, an ASIC, or one or more integrated circuits configured to control program execution of the method according to the first aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all the modules may be selected based on an actual requirement to achieve the objectives of the solutions of embodiments. In addition, in the accompanying drawings of the apparatus embodiments provided in this application, connection relationships between modules indicate that the modules have communications connections with each other, which may be implemented as one or more communications buses or signal cables.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be completed by a computer program can be easily implemented by using corresponding hardware, and a specific hardware structure used to achieve a same function may be of various forms, for example, in a form of an analog circuit, a digital circuit, a dedicated circuit, or the like. However, in this application, a software program implementation is a better implementation in most cases. Based on such an understanding, the technical solutions of this application essentially or the part contributing to the conventional technology may be implemented in a form of a software product. The software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of this application.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An information transmission method, comprising:
receiving, by a terminal device, a first synchronization signal and physical broadcast channel block measurement timing configuration (SMTC), wherein the first SMTC is associated with configuring an occasion for the terminal device to measure a synchronization signal and physical broadcast channel block (SSB);
obtaining, by the terminal device, an SSB measurement result by measuring the SSB in the occasion configured through the first SMTC;
determining, by the terminal device, that the SSB measurement result is incorrect for an SSB corresponding to any physical cell identifier (PCI) in response to the terminal device failing to measure at least one of the SSB in increasing order, or measure the SSB at a preset location; and
reporting, by the terminal device, in response to the SSB measurement result being incorrect, a first SMTC report, wherein the first SMTC report indicates that the SSB measurement result is incorrect,
wherein the first SMTC report comprises at least one of a PCI conflict indication, a cell global identifier, an SSB number, an SSB frequency, or a second SMTC; and
wherein the PCI conflict indication indicates that the terminal device determines that there is a PCI conflict between at least two cells corresponding to the SSB, wherein the cell global identifier uniquely identifies the cell corresponding to the SSB, wherein the SSB number is a number of the SSB, and identifies the SSB in an SSB set, wherein the SSB frequency is a serving frequency for the SSB, wherein the second SMTC is an SMTC determined by the terminal device, and wherein the second SMTC is different from the first SMTC.

2. The method according to claim 1, wherein the second SMTC comprises at least one of a periodicity, an offset, or a duration.

3. The method according to claim 1, wherein reporting the first SMTC report comprises reporting the first SMTC report to a first network device, wherein reporting the first SMTC report causes the first network device to adjust, based on the first SMTC report, at least one of a first PCI or the first SMTC, wherein the first PCI is a PCI of a cell corresponding to the SSB.

4. The method according to claim 3, wherein reporting the first SMTC report further causes the first network device to generate a second SMTC report based on the first SMTC report and send the second SMTC report to a third network device.

5. The method according to claim 1, wherein the SSB measurement result being incorrect indicates a PCI conflict.

6. A terminal device, comprising:
a transceiver;
at least one processor; and
one or more memories coupled to the at least one processor and storing programming instructions for execution by the at least one processor, the programming instructions including instructions to:
receive a first synchronization signal and physical broadcast channel block measurement timing configuration (SMTC), wherein the first SMTC is associated with configuring an occasion for the terminal device to measure a synchronization signal and physical broadcast channel block (SSB);
obtain an SSB measurement result by measuring the SSB in the occasion configured through the first SMTC;
determine that the SSB measurement result is incorrect for an SSB corresponding to any physical cell identifier (PCI) in response to failing to measure at least one of the SSB in increasing order, or measure the SSB at a preset location; and
report a first SMTC report in response to the SSB measurement result being incorrect, wherein the first SMTC report indicates that the SSB measurement result is incorrect,
wherein the first SMTC report comprises at least one of a PCI conflict indication, a cell global identifier, an SSB number, an SSB frequency, or a second SMTC; and
wherein the PCI conflict indication indicates that the terminal device determines that there is a PCI conflict between at least two cells corresponding to the SSB, wherein the cell global identifier uniquely identifies the cell corresponding to the SSB, wherein the SSB number is a number of the SSB, and identifies the SSB in an SSB set, wherein the SSB frequency is a serving frequency for the SSB, wherein the second SMTC is an SMTC determined by the terminal device, and wherein the second SMTC is different from the first SMTC.

7. The terminal device according to claim 6, wherein the second SMTC comprises at least one of a periodicity, an offset, or a duration.

8. The terminal device according to claim 6, wherein the instructions to report the first SMTC report include instructions to report the first SMTC report to a first network device, wherein the reporting the first SMTC report causes the first network device to adjust, based on the first SMTC report, at least one of a first PCI or the first SMTC, wherein the first PCI is a PCI of a cell corresponding to the SSB.

9. The terminal device according to claim 8, wherein the first SMTC report further causes the first network device to generate a second SMTC report based on the first SMTC report and send the second SMTC report to a third network device.

10. The terminal device according to claim 6, wherein the SSB measurement result being incorrect indicates a PCI conflict.

11. A network device, wherein the network device is a first network device and comprises:
a transceiver;
at least one processor; and
one or more memories coupled to the at least one processor and storing programming instructions for execution by the at least one processor, the programming instructions including instructions to:
send a first synchronization signal and physical broadcast channel block measurement timing configuration (SMTC), wherein the first SMTC is associated with configuring an occasion for a terminal device for measuring a synchronization signal and physical broadcast channel block (SSB); and
receive a first SMTC report, wherein the first SMTC report indicates that an SSB measurement result obtained by the terminal device through measurement based on the first SMTC is incorrect; and send the first SMTC report to a second network device, wherein the first SMTC report causes the second network device to adjust, based on the first SMTC report, at least one of a first physical cell identifier (PCI) or a third SMTC, wherein the first PCI is a PCI of a cell corresponding to the SSB, and wherein the third SMTC is an occasion configured by the second network device for the terminal device for measuring the SSB.

12. The network device according to claim 11, wherein the programming instructions further include instructions to:
adjust, based on the first SMTC report, at least one of the first PCI or the first SMTC, wherein the first PCI is a PCI of a cell corresponding to the SSB.

13. The network device according to claim 11, wherein the programming instructions further include instructions to:
send a second SMTC report to a third network device, wherein the second SMTC report is generated by the network device based on the first SMTC report, wherein the sending the second SMTC report causes the third network device to adjust the first PCI.

14. The network device according to claim 13, wherein the first SMTC report comprises at least one of a PCI conflict indication, a cell global identifier, an SSB number, an SSB frequency, or a second SMTC; and wherein the PCI conflict indication indicates that the terminal device determines that there is a PCI conflict between at least two cells corresponding to the SSB, wherein the cell global identifier uniquely identifies the cell corresponding to the SSB, wherein the SSB number is a number of the SSB and identifies the SSB in an SSB set, wherein the SSB frequency is a serving frequency for the SSB, wherein the second SMTC is an SMTC determined by the terminal device, and wherein the second SMTC is different from the first SMTC.

15. The network device according to claim 14, wherein the second SMTC report comprises at least one of the first SMTC report, a fourth SMTC, or a second PCI; and
wherein the fourth SMTC is an SMTC newly allocated by the first network device, and wherein the second PCI is a PCI newly allocated by the first network device to the cell corresponding to the SSB.

16. The network device according to claim 15, wherein the second SMTC comprises at least one of a periodicity, an offset, or a duration; and
wherein the fourth SMTC comprises at least one of a periodicity, an offset, or a duration.

17. The network device according to claim 11, wherein the SSB measurement result being incorrect indicates a PCI conflict.

* * * * *